(12) United States Patent
You et al.

(10) Patent No.: US 11,327,204 B2
(45) Date of Patent: *May 10, 2022

(54) PROJECTOR INCLUDING META-LENS

(71) Applicant: Samsung Electronics Co., Ltd., Suwon-si (KR)

(72) Inventors: Jangwoo You, Seoul (KR); Byunghoon Na, Suwon-si (KR); Seunghoon Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 942 days.

This patent is subject to a terminal disclaimer.

(21) Appl. No.: 15/992,829

(22) Filed: May 30, 2018

(65) Prior Publication Data

US 2019/0137665 A1    May 9, 2019

(30) Foreign Application Priority Data

Nov. 8, 2017 (KR) .......................... 10-2017-0148313

(51) Int. Cl.
| | | |
|---|---|---|
| *G02B 3/08* | (2006.01) | |
| *G02B 1/00* | (2006.01) | |
| *G01S 17/48* | (2006.01) | |
| *G01S 7/481* | (2006.01) | |
| *G02B 5/08* | (2006.01) | |

(Continued)

(52) U.S. Cl.
CPC .............. *G02B 3/08* (2013.01); *G01B 11/25* (2013.01); *G01S 7/4814* (2013.01); *G01S 17/48* (2013.01); *G02B 1/002* (2013.01); *G02B 5/008* (2013.01); *G02B 5/08* (2013.01); *G02B 5/189* (2013.01); *G02B 5/1809* (2013.01); *G02B 27/425* (2013.01); *G03B 21/142* (2013.01); *G03B 21/2033* (2013.01); *G02B 3/06* (2013.01); *G02B 19/0004* (2013.01); *G02B 19/0057* (2013.01)

(58) Field of Classification Search
None
See application file for complete search history.

(56) References Cited

U.S. PATENT DOCUMENTS

| | | | |
|---|---|---|---|
| 7,431,464 B2 | 10/2008 | Park | |
| 8,637,834 B2 | 1/2014 | Knippelmeyer et al. | |

(Continued)

FOREIGN PATENT DOCUMENTS

| | | |
|---|---|---|
| JP | 2011-181519 A | 9/2011 |
| WO | 2017/176921 A1 | 10/2017 |

OTHER PUBLICATIONS

Vertical-cavity surface-emitting laser (Year: 2016).*

(Continued)

*Primary Examiner* — Yuqing Xiao
*Assistant Examiner* — Amir J Askarian
(74) *Attorney, Agent, or Firm* — Sughrue Mion, PLLC

(57) ABSTRACT

Provided are projectors, each including a light source configured to emit laser light, a substrate spaced apart from the light source by a distance, a pattern mask including a pattern on a first surface of the substrate, the first surface facing the light source, and a meta-lens including a plurality of first nanostructures on a second surface of the substrate, the second surface facing the first surface, the nanostructures having a shape dimension of a sub-wavelength that is less than a wavelength of light emitted from the light source.

14 Claims, 6 Drawing Sheets

(51) Int. Cl.
  G02B 27/42 (2006.01)
  G01B 11/25 (2006.01)
  G03B 21/14 (2006.01)
  G02B 5/18 (2006.01)
  G02B 5/00 (2006.01)
  G03B 21/20 (2006.01)
  G02B 3/06 (2006.01)
  G02B 19/00 (2006.01)

(56) References Cited

U.S. PATENT DOCUMENTS

| | | |
|---|---|---|
| 8,836,766 B1 | 9/2014 | Hebert et al. |
| 9,218,755 B2 | 12/2015 | Chapman et al. |
| 9,939,129 B2 * | 4/2018 | Byrnes ............... G02B 19/0052 |
| 10,753,735 B2 * | 8/2020 | Ahmed ................ H01S 5/0651 |
| 2009/0116107 A1 * | 5/2009 | Kindler ................ G03B 21/567 |
| | | 359/457 |
| 2011/0188054 A1 | 8/2011 | Petronius et al. |
| 2013/0113927 A1 * | 5/2013 | De Bruijn ................ H04N 7/18 |
| | | 348/136 |
| 2014/0247326 A1 | 9/2014 | Hebert et al. |
| 2014/0376092 A1 | 12/2014 | Mor |
| 2015/0341619 A1 | 11/2015 | Meir et al. |
| 2016/0291200 A1 * | 10/2016 | Bakin ...................... G01V 8/20 |
| 2016/0299337 A1 | 10/2016 | Arbabi et al. |
| 2016/0316180 A1 | 10/2016 | Han et al. |
| 2018/0157058 A1 * | 6/2018 | Chou ................... G02B 5/1861 |
| 2018/0343438 A1 * | 11/2018 | Cho ................... G01B 11/2513 |
| 2019/0064532 A1 * | 2/2019 | Riley, Jr. ............ G02B 27/0927 |
| 2019/0154877 A1 * | 5/2019 | Capasso ................... G02B 1/00 |
| 2019/0204615 A1 * | 7/2019 | Cho ................... G02B 27/1086 |

OTHER PUBLICATIONS

Communication dated Feb. 1, 2019, issued by the European Patent Office in counterpart European Application No. 18180552.4.
Arbabi, A., et al., "An optical metasurface planar camera", Apr. 21, 2016, arxiv.org, Cornell University Library, 29 pages total.

* cited by examiner

PROJECTOR INCLUDING META-LENS

CROSS-REFERENCE TO RELATED APPLICATION

This application claims the benefit of Korean Patent Application No. 10-2017-0148313, filed on Nov. 8, 2017, in the Korean Intellectual Property Office, the disclosure of which is incorporated herein in its entirety by reference.

BACKGROUND

1. Field

The present disclosure relates to projectors including meta-lenses.

2. Description of the Related Art

Recently, the demand for miniaturization of laser projectors for combining with various electronic devices has increased. For example, for augmented reality (AR), virtual reality (VR), or mixed reality (MR) realized on mobile and wearable devices, a subminiature projector may be used. Also, in recognition of an object, such as a human or a thing, a laser projector may be used in order to form structured light in a depth sensor that is used for recognition of a precise three-dimensional image.

A laser projector of the related art includes a lens module including several sheets of optical lenses to realize a desired performance. Thus, the lens module is an obstacle for reducing the size of the laser projector. Also, it is very difficult to manufacture several sheets of optical lenses to have correct sizes, and further, the assembly and alignment of the manufactured optical lenses are difficult.

SUMMARY

Provided are projectors configured to emit light by using a nanostructured meta-lens.

Additional aspects will be set forth in part in the description which follows and, in part, will be apparent from the description, or may be learned by practice of the presented example embodiments.

According to an aspect of an example embodiment, a projector includes a light source configured to emit laser light, a substrate spaced apart from the light source by a predetermined (or alternatively, desired) distance, a pattern mask including a predetermined (or alternatively, desired) pattern on a first surface of the substrate, the first surface facing the light source, and a meta-lens including a plurality of first nanostructures on a second surface of the substrate, the second surface facing the first surface, the first nanostructures having a shape dimension of a sub-wavelength that is less than a wavelength of light emitted from the light source.

The pattern mask may include a first portion which is a region where laser light is absorbed or reflected and a second portion which is a region where laser light is transmitted, a pattern of the pattern mask is an image pattern formed by the second portion, and the image pattern is regularly or randomly arranged so as to form a predetermined (or alternatively, desired) structured light pattern.

The nanostructures may receive the structured light pattern and focus it on a focusing plane spaced apart from the meta-lens.

The pattern mask may be configured to contact the substrate.

The pattern mask may include a metal, a black matrix, or a polymer.

The light source may directly emit light with respect to the pattern mask, and may be a surface light-emitting diode.

The nanostructures may include a material having a refractive index greater than that of a peripheral material.

The projector may further include a housing fixing the light source and the substrate, wherein the projector is an integrated module.

The nanostructures may be arranged with an arrangement pitch less than a half of a wavelength of light emitted from the light source.

The substrate may include a first substrate and a second substrate stacked on the first substrate.

The light source may be an edge emitting device, an upper surface of which is parallel to the substrate, and the projector may further include a path change member that reflects light emitted from the edge emitting device to the first surface of the substrate.

The projector may further include a second meta-lens including a plurality of second nanostructures on a surface of the pattern mask facing the light source.

The second meta-lens may include a material having a refractive index greater than that of a peripheral material.

The second meta-lens may parallelize incident light.

The second nanostructures may include semi-cylindrical lenses.

The projector may further include a protective layer covering the pattern mask on the first surface of the substrate.

The protective layer may include a material having a refractive index lower than that of the second meta-lens.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
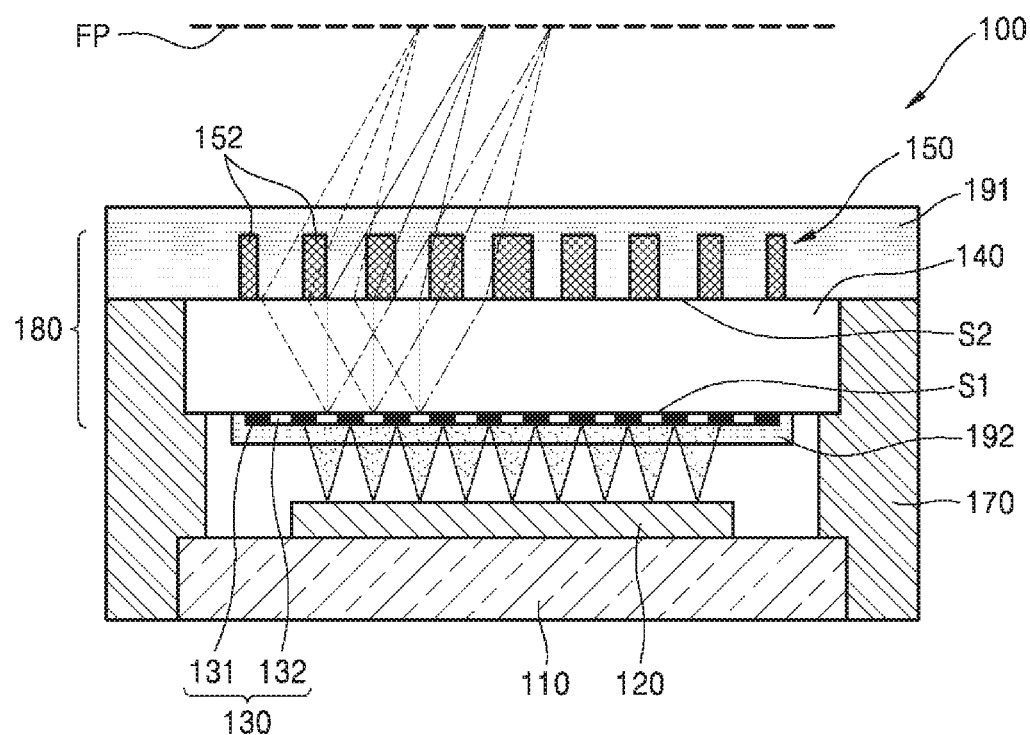
FIG. 1 is a schematic side cross-sectional view of a structure of a projector including a meta-lens, according to an example embodiment.

Hereinafter, example embodiments will be described in detail with reference to the accompanying drawings. In the drawings, thicknesses of layers or regions may be exaggerated for clarity of the specification. The example embodiments of the inventive concept are capable of various modifications and may be embodied in many different forms.

It will be understood that when an element or layer is referred to as being "on" or "above" another element or layer, the element or layer may be directly on another element or layer or intervening elements or layers.

FIG. 1 is a schematic side cross-sectional view of a structure of a projector 100 including a meta-lens, according to an example embodiment.

Referring to FIG. 1, the projector 100 includes a light source 120, and a substrate 140 spaced apart by a predetermined (or alternatively, desired) distance from the light source 120. The substrate 140 includes a first surface S1 facing the light source 120 and a second surface S2 facing the first surface S1 with the substrate 140 therebetween. A pattern mask 130 that reflects some portions of light and transmits remaining portions of the light is arranged on the first surface S1 so as to contact the first surface S1. A meta-lens 150 is arranged on the second surface S2. The meta-lens 150 includes nanostructures having a nano size, for example, nano columns 152, and may focus light transmitted through the substrate 140. The substrate 140, the pattern mask 130, and/or the meta-lens 150 constitute a lens structure 180. A first protective layer 191 may be formed on the second surface S2 of the substrate 140 to cover the meta-lens 150. A height of the nano columns 152 may be approximately 0.5 mm. A height of the first protective layer 191 may be greater than the height of the nano columns 152 by approximately 1 μm. A second protective layer 192 may be formed on the first surface S1 of the substrate 140. A thickness of the second protective layer 192 may be approximately 2 μm.

The light source 120 may be a laser diode that emits laser light. The light source 120 may be a surface light-emitting diode. The surface light-emitting diode may be a vertical-cavity surface-emitting laser (VCSEL). For example, the light source 120 may be a VCSEL including a GaAs-based active layer, and may emit laser light of approximately 850 nm or 940 nm. As another example, the light source 120 may emit light of a near-infrared wavelength band.

In the light source 120, light is emitted from a plurality of light-emitting points directly towards the pattern mask 130. In the light source 120, laser light may be emitted from the light-emitting points arranged in a two-dimensional (2D) array on a surface of a single VCSEL. The light source 120 may include a plurality of VCSELs.

The first surface S1 and the second surface S2 of the substrate 140 may be substantially parallel to each other. However, it is unnecessary that the first surface S1 and the second surface S2 are completely parallel to each other, and may be slanted relative to each other. The substrate 140 may include a transparent material. The transparent material may denote a material having high light transmittance. For example, the substrate 140 may include fused silica, quartz, a polymer (PMMA etc.), and plastic. The substrate 140 may have a sub-millimeter thickness or a thickness of less than a few millimeters.

The substrate 140 may include a first substrate 141 (refer to FIG. 6) and a second substrate 142 (refer to FIG. 6) that are stacked and bonded together. The first and second substrates 141 and 142 may include the same material or different materials from each other.

The first protective layer 191 and the second protective layer 192 may include a transparent dielectric. For example, The first protective layer 191 and the second protective layer 192 may include a silicon oxide or a polymer.

The pattern mask 130 selectively transmits light entering from the light source 120. The pattern mask 130 includes a first portion 131 that reflects or absorbs incident light and a second portion 132 that transmits incident light. The second portion 132 is a region from which a material that forms the pattern mask 130 is removed. The pattern mask 130 may include a metal including Cr or Al, a black matrix, or a polymer. The pattern mask 130 may have a thickness of less than a few hundred nanometers. The second portion 132 may be an image having a predetermined (or alternatively, desired) pattern.

Figure 2:
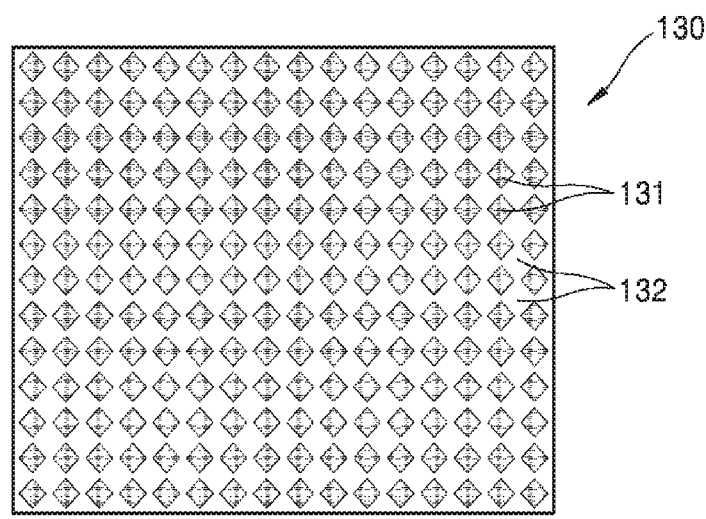
FIG. 2 is a plan view of a pattern mask of a projector according to an example embodiment.

FIG. 2 is a plan view of the pattern mask 130 of FIG. 1.

Referring to FIG. 2, the pattern mask 130 includes a first portion 131 that reflects incident light and a second portion 132 that is a through hole portion surrounded by the first portion 131. The incident light enters the substrate 140 exposed by the second portion 132. The first portion 131 reflects or absorbs incident light. The second portion 132 that surrounds the first portion 131 transmits incident light. Light that has passed through the pattern mask 130 has an image by the second portion 132. In FIG. 2, the first portions 131 are arranged in a 2D-array type. However, example embodiments are not limited thereto. For example, the second portion 132 may have various images. The first portions 131 may be formed with a period of approximately 1 μm-2 μm. The second portions 132 may be formed with a period of approximately 1 μm-2 μm.

The pattern mask 130 may be formed by etching a metal layer, a black matrix layer, or a polymer layer after forming the metal layer, the black matrix layer, or the polymer layer on the first surface S1 of the substrate 140. The pattern mask 130 may be formed in various shapes.

The pattern mask 130 changes incident light to a structured light having a predetermined (or alternatively, desired) pattern and outputs it. When light enters the pattern mask 130 from the light source 120, the pattern mask 130 forms a distribution of rays of light progressing in a space. The rays of light form beam spots with a predetermined (or alternatively, desired) angle on a space. The beam spots may have various distributions that are determined by detailed conditions applied to the pattern mask 130. This is referred to as structured light.

The structured light generated in the pattern mask 130 may be a first pattern that is mathematically coded to uniquely have angles and directions of the rays of light progressing towards each of points, and to have location coordinates of the corresponding points on a focusing plane FP which will be described below. The shape of the first pattern may vary by an object having a 3D shape, and a second pattern is obtained by imaging with an image pick-up device, such as a camera. The first pattern and the second pattern are compared and the degrees of shape changes of patterns in each of the coordinates are traced, and thus, depth information of the object having the 3D shape may be extracted.

The meta-lens 150 may include a material having a refractive index greater than that of the substrate 140. For example, the refractive index of the meta-lens 150 is greater than that of the substrate 140 by more than 1. The meta-lens 150 may include single crystal silicon, polycrystalline silicon, amorphous silicon, $Si_3N_4$, GaP, $TiO_2$, AlSb, AlAs, AlGaAs, AlGaInP, BP, or $ZnGeP_2$. Also, the meta-lens 150 may include a metal material.

The meta-lens 150 may include a conductive material. The conductive material may be a metal material having conductivity to cause a surface plasmon excitation. For example, the conductive material may include Cu, Al, Ni, Fe, Co, Zn, Ti, ruthenium (Ru), rhodium (Rh), palladium (Pd), Pt, Ag, osmium (Os), iridium (Ir), or Au and an alloy of these materials. Also, the meta-lens 150 may include a 2D material having high conductivity, such as graphene or a conductive oxide. The conductive oxide may include an indium zinc oxide (IZO), an indium tin oxide (ITO) or an aluminum zinc oxide (AZO).

Some of nano columns 152 of the meta-lens 150 may include a dielectric material having a high refractive index and some of the nano columns 152 may include conductive materials.

Figure 3:
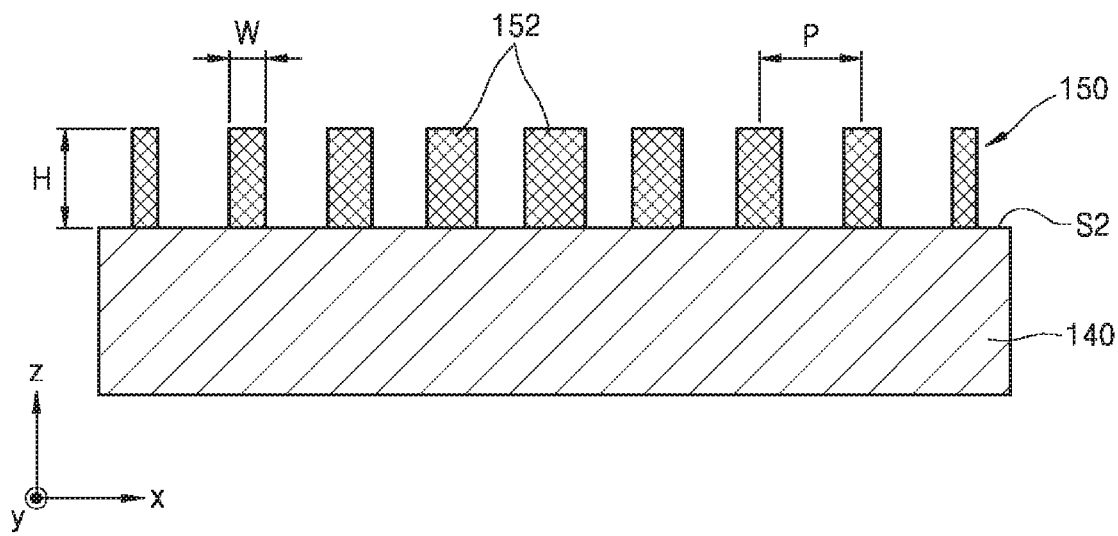
FIG. 3 is a schematic side cross-sectional view of a meta-lens of a projector according to an example embodiment.

FIG. 3 is a schematic side cross-sectional view of the meta-lens 150 of FIG. 1. Referring to FIG. 3, the meta-lens 150 includes a plurality of nanostructures on the second surface S2 of the substrate 140. The nanostructures may be the nano columns 152.

The nano columns 152 have a shape dimension of a sub-wavelength less than a wavelength λ of light emitted from the light source 120. The shape dimension denotes dimensions that define the shape of the nano columns 152, for example, a height H of the nano columns 152 and a width W of a cross-section of the nano columns 152. Also, an arrangement pitch P of the nano columns 152 has a value less than the wavelength λ. In FIG. 3, the nano columns 152 having a constant arrangement pitch P are depicted, but example embodiments are not limited thereto. For example, the nano columns 152 may be arranged with a constant gap therebetween.

The shape dimension and the arrangement pitch P of the nano columns 152 may be less than a half of a wavelength of light emitted from the light source 120. The smaller the arrangement pitch P of the nano columns 152 than a wavelength of light emitted from the light source 120, incident light may be controlled to a desired shape without performing a high-order diffraction.

A cross-sectional shape of the nano columns 152, that is, the shape of a cross-section parallel to an XY plane may be various shapes, for example, a circular shape, an oval shape, a rectangular shape, a polygonal shape, a cross-shape, a honeycomb shape, or a non-symmetrical shape. Also, all the shapes of the nano columns 152 may be the same, but example embodiments are not limited thereto. The cross-sectional shape of the nano columns 152 may include various shapes. The width W of the nano columns 152 may be a diameter of the circular shape, an average diameter of the oval shape, an average length of sides of the rectangular shape, an average diameter of the polygonal shape, a traverse length of the cross-shape, an average diameter of the honeycomb shape, or an average diameter of the non-symmetrical shape. Hereinafter, the dimension of the cross-section is referred to as a "diameter" for convenience.

An aspect ratio of the nano columns 152 may be in a range from about 2 to about 7.

The meta-lens 150 is designed to function as a convex lens or a focusing lens. A shape distribution of the nano columns 152 in FIG. 3 may be determined to perform a function of a convex lens. The shape distribution of the nano columns 152 may be determined so that the nano columns 152 are arranged to have a width that gradually reduces towards an outer side from a predetermined (or alternatively, desired) reference point. The example shape distribution of the nano columns 152 may be repeated, and a repeating period of the shape distribution may not be constant and may vary.

The meta-lens 150 may focus light emitted from the substrate 140, and may form a focal point on the focusing plane FP spaced apart from the substrate 140 by a predetermined (or alternatively, desired) distance. The focusing plane FP may be located at a distance of one or more times a focal distance of the meta-lens 150 to an infinite distance. For example, the focusing plane FP may be located at a distance of several tens of centimeters to several meters from the meta-lens 150. The meta-lens 150 focuses incident structured light SL having a predetermined (or alternatively, desired) pattern and projects the structured light SL onto the focusing plane FP. The structured light SL entering the focusing plane FP may be an image pattern coded so as to have angles and directions of rays of light progressing towards each of points on the focusing plane FP, and to have location coordinates of the points. The shape of the image pattern may be changed by a 3D object. The image pattern is compared with an image pattern reflected by the object, wherein the image pattern reflected by the 3D object is imaged by an image capture device, such as a camera, and thus, depth information of the 3D object may be extracted.

The nano columns 152 described above may have unique values of transmission intensities and transmission phases according to a material and a shape of each of the nano columns 152. Through controlling shape distributions of the nano columns 152, a phase or intensity of light transmitting through the meta-lens 150 may be controlled. Hereinafter, the "shape distribution" may denote at least one of the shapes of the nano columns 152, the dimensions of the nano columns 152, the size distributions of the nano columns 152, the arrangement pitch of the nano columns 152, and/or the distribution of the arrangement pitch of the nano columns 152.

The nano columns 152 depicted in FIG. 3 have the same height in an example, but are not limited thereto. For example, a desired transmission intensity distribution or a desired transmission phase distribution may be formed by controlling the size in a horizontal direction or a vertical direction according to locations of nano columns 152 or constituent materials of nano columns 152. In order to form a desired transmission intensity distribution or a desired transmission phase distribution, a shape distribution of the nano columns 152 according to locations may be determined with respect to a predetermined (or alternatively, desired) group including a plurality of nano columns 152. Also, the nano column group formed in this manner may be repeatedly arranged with a predetermined (or alternatively, desired) period. The shape distribution of the nano columns 152 may be regular, periodic, or pseudo-periodic, but is not limited thereto, that is, may be random.

The nano columns 152 of the meta-lens 150 have a very small pitch and a very thin thickness when compared to a micro optical part of the related art, and thus, may form an arbitrary pattern without high-order diffraction with respect to a wide angle range. Accordingly, the projector 100 may have a subminiature size. For example, a height of the projector 100 may be less than 4 mm.

Figure 4:
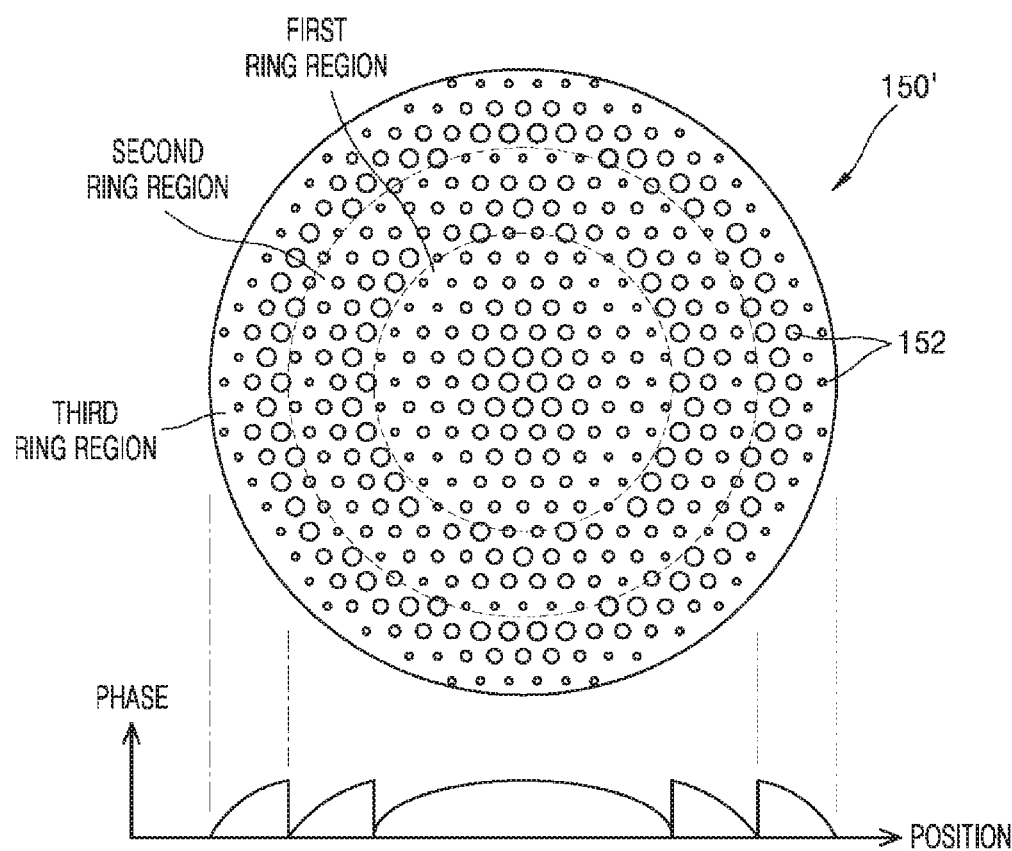
FIG. 4 is a schematic plan view of a meta-lens of a projector according to another example embodiment.

FIG. 4 is a schematic plan view of a meta-lens 150' according to another example embodiment. Referring to FIG. 4, the meta-lens 150' may be a meta-surface including a plurality of nano columns 152 on the substrate 140 (refer to FIG. 1).

The meta-lens 150' may be a Fresnel lens. In FIG. 4, a lower part shows a side cross-sectional view of the Fresnel lens corresponding to the meta-lens 150'. The meta-lens 150' includes a plurality of the nano columns 152 arranged in a 2D array and is manufactured by a semiconductor process, and thus, the miniaturization of the meta-lens 150' is possible.

The meta-lens 150' may be arranged in a symmetrical structure with the center of the nano columns 152 as a reference in order to have a function of a focusing optical device. For example, referring to FIG. 4, in order to function as a Fresnel lens, the meta-lens 150' may include a plurality of ring regions. Diameters of the nano columns 152 of each of the ring regions are gradually reduced as it is away from the center of a first ring region. For example, the meta-lens 150' may include first through third ring regions away from the center of the meta-lens 150'. However, example embodiments are not limited thereto. For example, the meta-lens 150' may further include ring regions greater than the three ring regions.

Referring back to FIG. 1, the projector 100 may be an integrated module. That is, the projector 100 may further include a supporter 110 for supporting the light source 120 and a housing 170 that fixes the substrate 140.

The projector 100 according to an example embodiment uses a meta-lens 150 instead of a lens module including a plurality of lenses of the related art. Therefore, miniaturization of the projector 100 is possible. Also, a process for aligning a plurality of lenses of the lens module is unnecessary, the manufacturing process is simple.

The projector 100 according to an example embodiment may project an image of the pattern mask 130 onto the focusing plane FP, and also, may be used for illumination.

Also, the projector 100 according to an example embodiment projects an image formed by structured light onto an object, and captures an image reflected by the object, and thus, may be used as a light irradiation apparatus of a depth sensor. When capturing light reflected by an object after irradiating an image formed by structured light, further correct depth information may be obtained when compared to a case when capturing light reflected by an object after irradiating general light.

Figure 5:
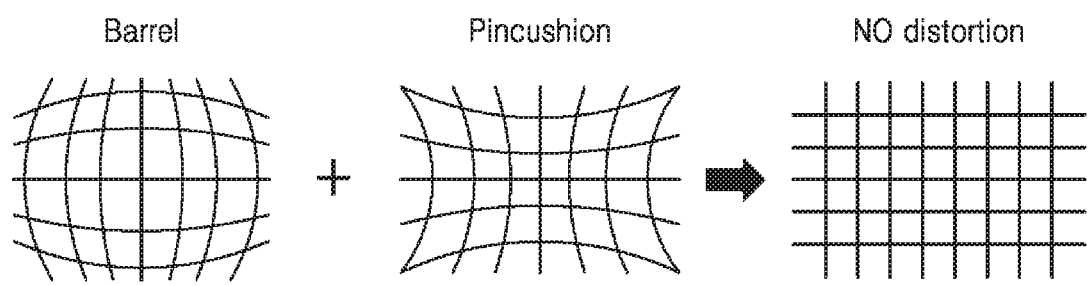
FIG. 5 is a schematic diagram for explaining a method of reducing or preventing image distortion of a projector, according to an example embodiment.

FIG. 5 is a schematic diagram for explaining a method of reducing or preventing an image distortion of the projector 100 according to an example embodiment.

An image which is an exposed region of a pattern mask is designed to include a barrel distortion in advance. The barrel distortion is designed to compensate a pincushion distortion in a meta-lens. Accordingly, an image projected to a focusing plane may be an image of no distortion.

Figure 6:
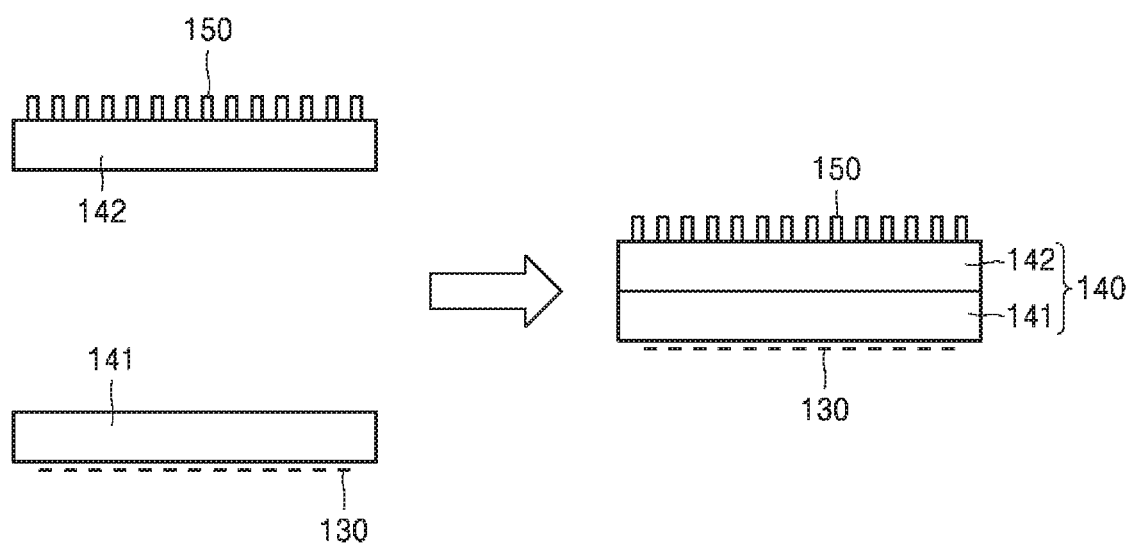
FIG. 6 is a diagram for explaining a method of manufacturing a lens structure of a projector, according to an example embodiment.

FIG. 6 is a diagram for explaining a method of manufacturing a lens structure 180 according to an example embodiment. Like reference numerals are used for elements that are substantially identical to the elements of FIG. 1, and the descriptions thereof will be omitted.

Referring to FIG. 6, a first layer including a metal layer, a black matrix layer, and a polymer layer is formed on a first substrate 141. Next, a pattern mask 130 is formed by patterning the first layer.

A second layer including a material for forming a meta-lens is formed on a second substrate 142. A meta-lens 150 is formed on the second substrate 142 by pattering the second layer.

Next, when the first substrate 141 and the second substrate 142 are bonded to contact each other, a lens structure 180 on which the pattern mask 130 and the meta-lens 150 are respectively formed on both surfaces of the substrate 140 may be formed.

The method of manufacturing a lens structure 180 according to an example embodiment does not require an additional aligning process, and thus, the manufacturing of the lens structure 180 is easy and the yield of manufacturing the lens structure 180 is increased.

Figure 7:
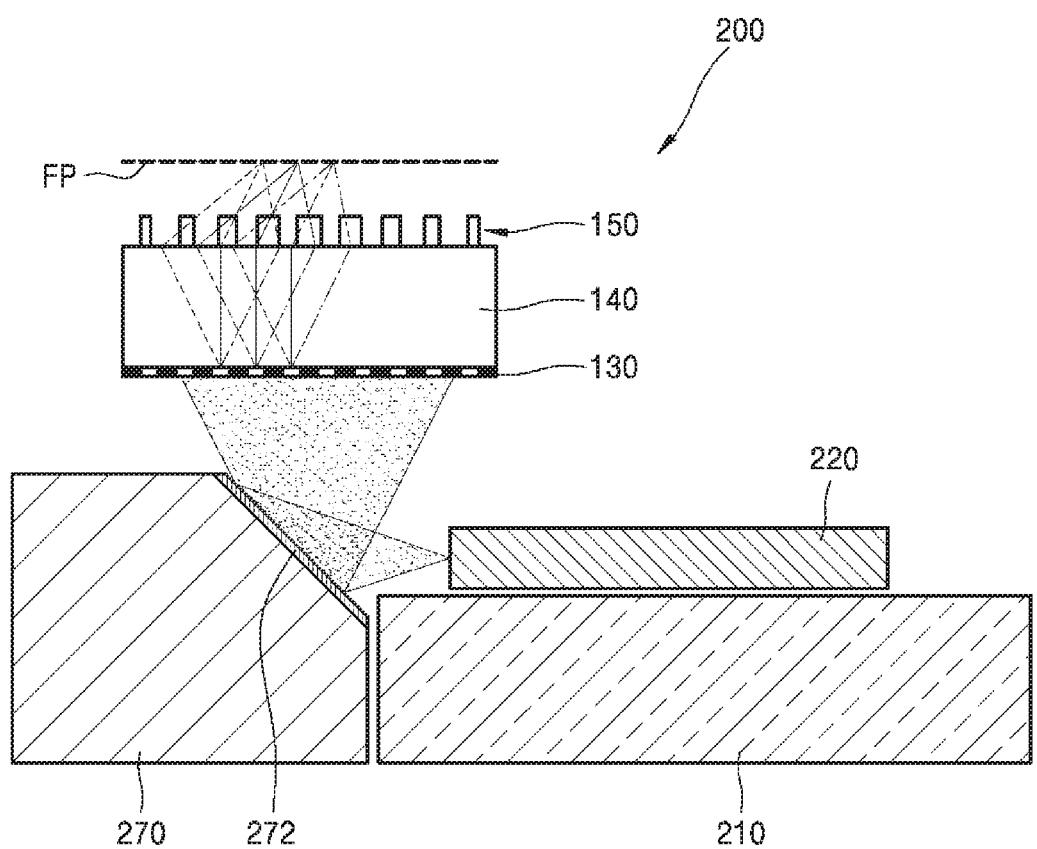
FIG. 7 is a schematic side cross-sectional view of a structure of a projector including a meta-lens, according to another example embodiment.

FIG. 7 is a schematic side cross-sectional view of a structure of a projector 200 including a meta-lens according to another example embodiment. Like reference numerals are used for elements that are substantially identical to the elements of FIG. 1, and the descriptions thereof will be omitted.

Referring to FIG. 7, the projector 200 includes an edge emitting diode as a light source 220 on a supporter 210. The light source 220 may be a Fabry-Perot laser diode or a DFB laser diode.

The substrate 140 is spaced apart from the light source 220 by a predetermined (or alternatively, desired) distance. The substrate 140 includes a first surface S1 (refer to FIG. 1) facing the light source 220 and a second surface S2 (refer to FIG. 1) facing the first surface S1 with the substrate 140 therebetween. The pattern mask 130 that reflects some portions of light, and makes remaining portions of the light to structured light and transmits them is attached to the first surface S1 of the substrate 140. The meta-lens 150 is arranged on the second surface S2. The meta-lens 150 includes nano columns 152 having a nano size, and may focus light transmitted through the substrate 140 on the focusing plane FP. For example, the focusing plane FP may be located at a distance of several tens of centimeters to several meters from the meta-lens 150.

A first protective layer (refer to the first protective layer 191 of FIG. 1) may be formed on the second surface S2 of the substrate 140 to cover the pattern mask 130. A second protective layer (refer to the second protective layer 192 of FIG. 1) may be formed on the first surface S1 of the substrate 140. The first protective layer 191 and the second protective layer 192 are not shown in FIG. 7 for convenience.

A path change member 270 that changes a path of light emitted from the light source 220 may be arranged on a side of the light source 220. The path change member 270 may include a reflection surface 272 that reflects a path of light emitted from the light source 220 with a predetermined (or alternatively, desired) angle.

The reflection surface 272 formed on the path change member 270 may be a mirror coating. The reflection surface 272 is arranged to bend an optical path to a predetermined (or alternatively, desired) angle considering a relative location of the pattern mask 130 with respect to a light emission surface of the light source 220. In FIG. 7, it is depicted as the optical axis is bent in a vertical direction.

The pattern mask 130 and the meta-lens 150 respectively attached to the first and second surfaces S1 and S2 of the substrate 140 may be the same as the pattern mask 130 and the meta-lens 150 of FIG. 1. The pattern mask 130 and the meta-lens 150 of the projector 200 according to the present example embodiment may use the same pattern mask and the meta-lens designed in advance regardless of the types of light sources, for example, a surface emitting diode or an edge emitting diode.

The projector 200 uses an edge emitting diode as the light source 220 and the path change member 270 may be designed as necessary to adapt to a location between the light source 220 and the substrate 140. Also, when compared the projector 200 with the projector 100, a gap between the substrate 140 and the light source 220 may be formed narrower in the projector 200 than in the projector 100, thus, the miniaturization of the projector 200 may be further achieved.

The lens structure 180 including the pattern mask, the substrate, the meta-lens according to the present example embodiment may be used regardless of the types of light sources.

Figure 8:
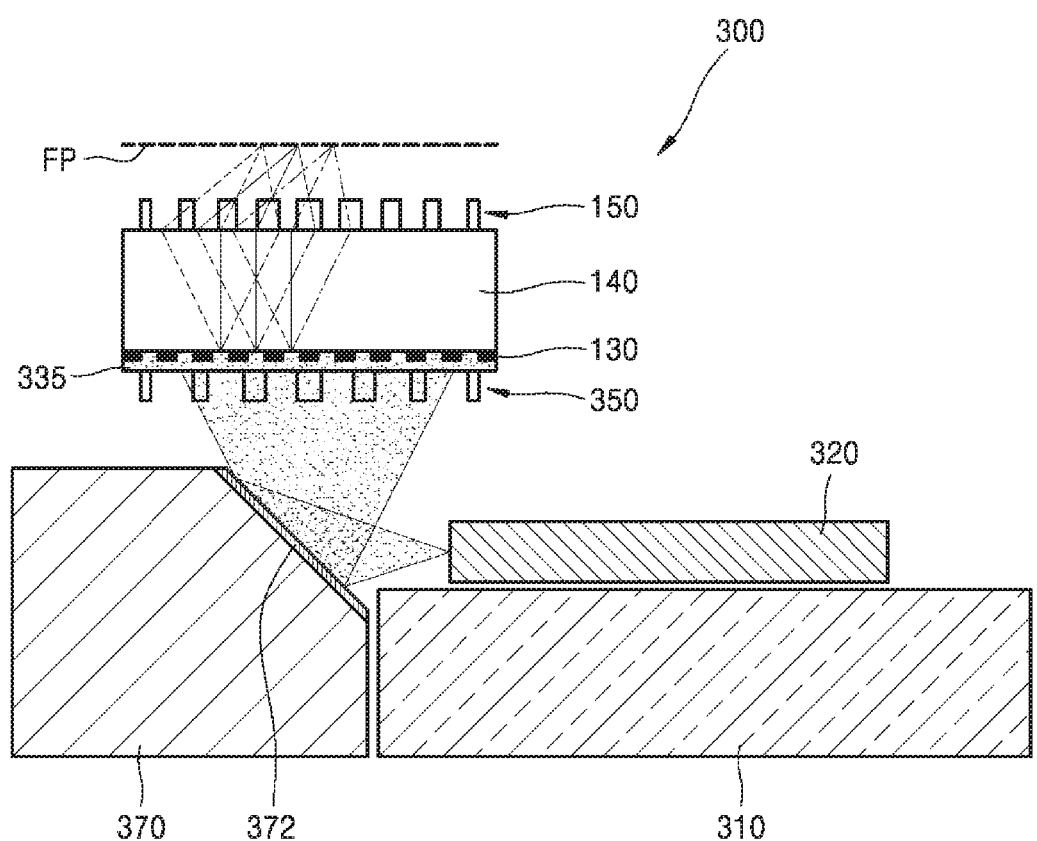
FIG. 8 is a schematic side cross-sectional view of a structure of a projector including a meta-lens, according to another example embodiment.

FIG. 8 is a schematic side cross-sectional view of a structure of a projector 300 including a meta-lens according to another example embodiment. Like reference numerals are used for elements that are substantially identical to the elements of FIGS. 1 and 7, and the descriptions thereof will be omitted.

Referring to FIG. 8, the projector 300 includes an edge emitting diode as a light source 320 on a supporter 310. A substrate 140 is spaced apart from the light source 320 by a predetermined (or alternatively, desired) distance. The substrate 140 includes a first surface S1 (refer to FIG. 1) facing the light source 320 and a second surface S2 (refer to FIG. 1) facing the first surface S1 with the substrate 140 therebetween. A pattern mask 130 that reflects some portions of light, and converts remaining portions of the light to structured light and transmits them is attached to the first surface S1 of the substrate 140. The meta-lens 150 is arranged on the second surface S2 of the substrate 140. The meta-lens 150 may include nano columns 152 (refer to FIG. 1) having a nano size and may focus light that has passed through the substrate 140 on the focusing plane FP. For example, the focusing plane FP may be located at a distance of several tens of centimeters to several meters from the meta-lens 150.

Figure 9:
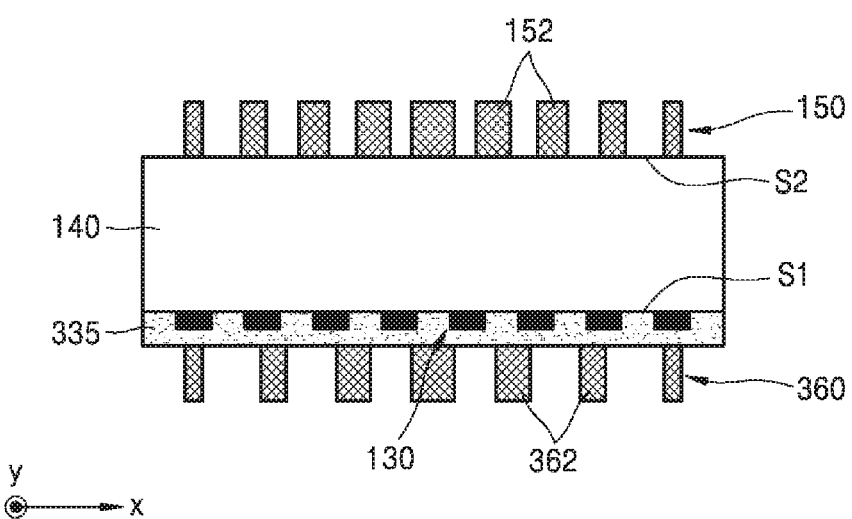
FIG. 9 is a magnified side cross-sectional view of a lens structure of FIG. 8.

FIG. 9 is a magnified side cross-sectional view of a lens structure of FIG. 8. Referring to FIG. 9, the pattern mask 130 that reflects some portions of light and transmits remaining portions of the light is attached to the first surface S1 of the substrate 140. A protective layer 335 covering the pattern mask 130 is formed on the first surface S1 of the substrate 140. The protective layer 335 may include a material having a refractive index lower than that of a second meta-lens 360 which will be described below. For example, the refractive index of the protective layer 335 may be less than that of the second meta-lens 360 by greater than 1. The protective layer 335 may have a thickness enough to completely cover the pattern mask 130, for example, approximately 2 μm. The protective layer 335 may include a silicon oxide or a polymer. The protective layer 335 provides a flat surface for forming the second meta-lens 360.

A first protective layer (refer to the first protective layer 191 of FIG. 1) may be formed on the second surface S2 of the substrate 140 to cover the meta-lens 150. The first protective layer 191 are not shown in FIG. 9 for convenience.

The second meta-lens 360 is formed on the protective layer 335. The second meta-lens 360 may include a plurality of second nanostructures. The second meta-lens 360 may include a plurality of nano columns 362 like the meta-lens 150. The second meta-lens 360 may be a collimating lens that converts incident light to parallel light.

Also, the second meta-lens 360 may include a plurality of cylindrical lenses or semi-cylindrical lenses. An edge emitting diode used as the light source 320 emits light having a large diffusion angle. The light source 320 may emit spot light in which a diameter of a long axis (an x-axis) is greater than a short axis (a y-axis). Accordingly, light that has passed through the pattern mask 130 may diverge in an undesired angle, and thus, effective light may be reduced.

Figure 10:
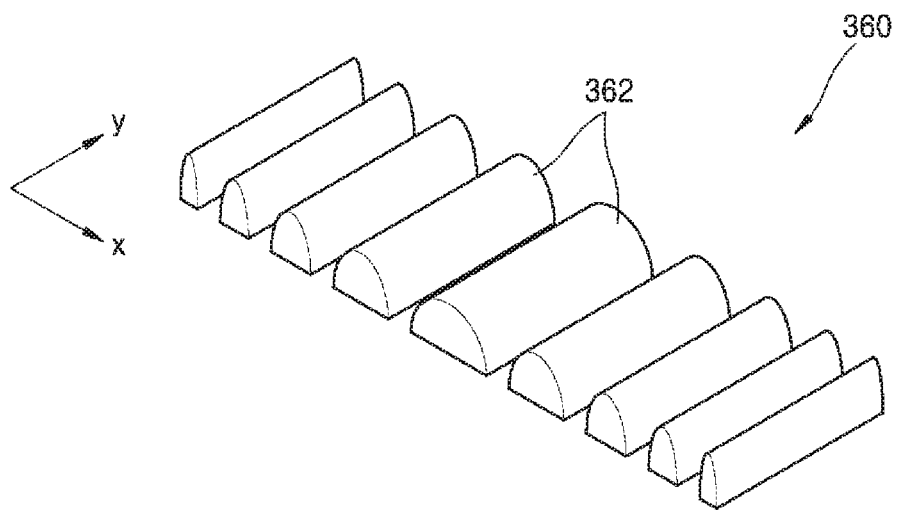
FIG. 10 is a perspective view showing an example of a second meta-lens of a projector, according to an example embodiment.

The cylindrical lens and the semi-cylindrical lens may be lenses on which a curved surface is formed with respect to the long axis (the x-axis) of emitted light. FIG. 10 shows an example of the second metal-lens 360 including a plurality of semi-cylindrical lenses 362. In FIG. 10, the second meta-lens 360 having 9 cylindrical lenses 362 is depicted, but the second meta-lens 360 according to example embodiments is not limited thereto. The second meta-lens 360 may be a lens in which a semi-cylindrical set of FIG. 10 is repeated in an x-direction and a y-direction.

The projector 300 according to example embodiments may reduce light loss when compared to the projector 200 since light incident to the second meta-lens 360 is collimated.

Figure 11:
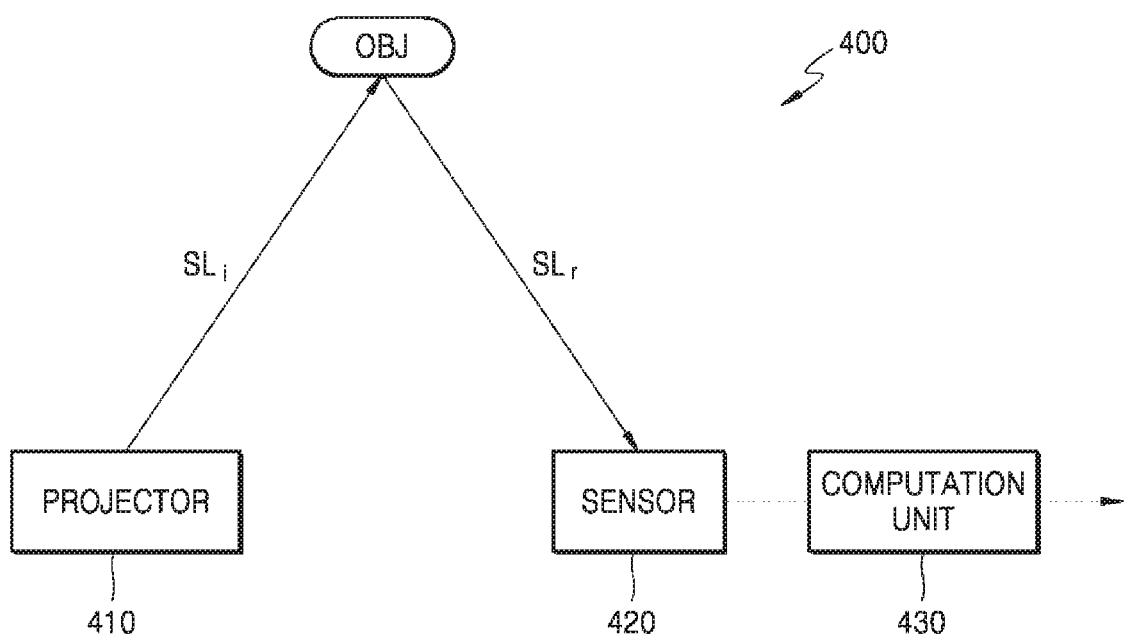
FIG. 11 is a block diagram showing a schematic configuration of a depth recognition apparatus according to an example embodiment.

FIG. 11 is a block diagram showing a schematic configuration of a depth recognition apparatus 400 according to an example embodiment.

The depth recognition apparatus 400 includes a projector 410 configured to irradiate structured light $SL_i$ to an object OBJ, a sensor 420 that receives the structured light $SL_r$ reflected from the object OBJ, and a computation unit 430 configured to compute a depth location of the object OBJ by comparing the structured light $SL_i$ t irradiated from the projector 410 and the structured light $SL_r$ received by the sensor 420.

The projector 410 converts light emitted from a light source into a structured light pattern and outputs the structured light pattern, and may be one of the projectors 100, 200, and 300 according to the example embodiments described above.

The sensor 420 senses the structured light $SL_r$ reflected by the object OBJ. the sensor 420 may include an array of optical detection elements. The sensor 420 may further include a dispersing element for analyzing light reflected by the object OBJ for each wavelength.

The computation unit 430 obtains depth information with respect to the object OBJ by comparing structured light $SL_i$ irradiated to the object OBJ and structured light $SL_r$ reflected by the object OBJ, and may analyze a 3D shape, location, and movement of the object OBJ. The structured light $SL_i$ generated from the projector 410 may be a pattern mathematically coded to uniquely have an angle and a direction of rays progressing towards points of a focusing plane FP and to have location coordinates of the corresponding points. When the coded pattern is reflected by the object OBJ, a pattern of reflected structured light $SL_r$ has a changed shape from the pattern of irradiated structured light $SL_i$. Depth information of the object OBJ may be extracted by comparing the patterns and tracing the patterns in each of the coordinates. From this result, three-dimensional information related to the shape and movement of the object OBJ may be extracted.

Optical elements for controlling direction of the structured light $SL_i$ emitted from the projector 410 to progress towards the object OBJ or additional modulation may further be arranged between the projector 410 and the object OBJ.

Also, the depth recognition apparatus 400 may further include a controller that generally controls driving of a light source included in the projector 410 or operating of the sensor 420. Also, the depth recognition apparatus 400 may further include a memory for storing a computation program to be performed in the computation unit 430 for extracting 3D information. The computation unit 430 may be a processor and its functionality implemented in software and/or hardware.

A result of computation in the computation unit 430, that is, information about the shape and location of the object OBJ may be transmitted to another unit. For example, the above information may be transmitted to a controller of an electronic device employed in the depth recognition apparatus 400. The other unit to which the result is transmitted may be a display or a printer that outputs the result. Besides above, the other unit may include a smart phone, a mobile phone, a personal digital assistance (PDA), a laptop, a personal computer PC, a wearable device, and other mobile or non-mobile devices, but is not limited thereto.

The depth recognition apparatus 400 may be used as a sensor that precisely acquires 3D information with respect to an object OBJ on the front, and thus, may be employed in various electronic devices. The electronic device may be autonomous driving equipment, for example, an autonomous car, a driverless car, a robot, a drone, etc. Besides above, the electronic device may be a mobile communication device or an internet of things (IOT) device.

In a projector according to the example embodiments, a thin meta-lens is used instead of a lens module including a plurality of lenses of the related art, and thus, miniaturization of the projector is possible. Also, for manufacturing the projector, a process of aligning the lenses of the lens module is unnecessary, and thus, the manufacturing of the projector is simplified.

The projector according to the example embodiments may project an image of a pattern mask, and also, may be used as an illuminator.

Also, the projector according to the example embodiments irradiates an image formed of structured light to an object and captures an image reflected by the object, and thus, may be used as a light irradiation device of a depth sensor. When capturing light reflected by an object by irradiating an image formed of structured light, further correct depth information may be obtained when compared to irradiating general light to the object.

A lens structure of the projector according to the example embodiments may be used regardless of a light source.

While one or more embodiments have been described with reference to the figures, it will be understood by those of ordinary skill in the art that various changes in form and details may be made therein without departing from the spirit and scope as defined by the following claims.

What is claimed is:

1. A projector comprising:
a light source configured to emit laser light;
a substrate apart from the light source;
a pattern mask comprising a pattern on a first surface of the substrate, the first surface facing the light source, the pattern being configured to form a structured light; and
a first meta-lens configured to focus the structured light on a predetermined focus plane, the first meta-lens including a plurality of first nanostructures contacting a second surface of the substrate, the second surface facing the first surface, the plurality of first nanostructures having a shape dimension of a sub-wavelength that is less than a wavelength of light emitted from the light source.

2. The projector of claim 1, wherein the pattern mask comprises a first portion which is a region where laser light is absorbed or reflected and a second portion which is a region where laser light is transmitted, and
the pattern of the pattern mask is an image pattern formed by the second portion, and the image pattern is regularly or randomly arranged so as to form the structured light.

3. The projector of claim 2, wherein the plurality of first nanostructures receive the structured light pattern and focus the structured light pattern on a focusing plane spaced apart from the first meta-lens.

4. The projector of claim 1, wherein the pattern mask is configured to contact the substrate.

5. The projector of claim 1, wherein the pattern mask comprises a metal, a black matrix, or a polymer.

6. The projector of claim 1, wherein the light source is a surface light-emitting device configured to directly emit light with respect to the pattern mask.

7. The projector of claim 6, wherein the light source is a surface light-emitting diode.

8. The projector of claim 1, wherein the plurality of first nanostructures comprise a material having a refractive index greater than that of a peripheral material.

9. The projector of claim 1, further comprising a housing configured to fix the light source and the substrate, wherein the projector is an integrated module.

10. The projector of claim 1, wherein the plurality of first nanostructures have a pitch less than a half of a wavelength of light emitted from the light source.

11. The projector of claim 1, wherein the substrate comprises a first substrate and a second substrate which is stacked on the first substrate.

12. The projector of claim 1, further comprising a protective layer on the second surface of the substrate to cover the meta-lens.

13. A depth recognition apparatus comprising:
the projector of claim 1 configured to irradiate structured light to an object;
a sensor configured to receive the structured light reflected by the object; and
a computation unit configured to compute a depth location of the object by comparing the structured light irradiated from the projector with the structured light received by the sensor.

14. An electronic device comprising;
the depth recognition apparatus of claim 13;
a processor configured to receive an information of the depth location of the object.

* * * * *